Nov. 8, 1960   R. W. WILSON   2,959,141
PLANT TRAY STRUCTURE FOR PLANT SETTING MACHINES
Filed Dec. 11, 1956   2 Sheets-Sheet 1
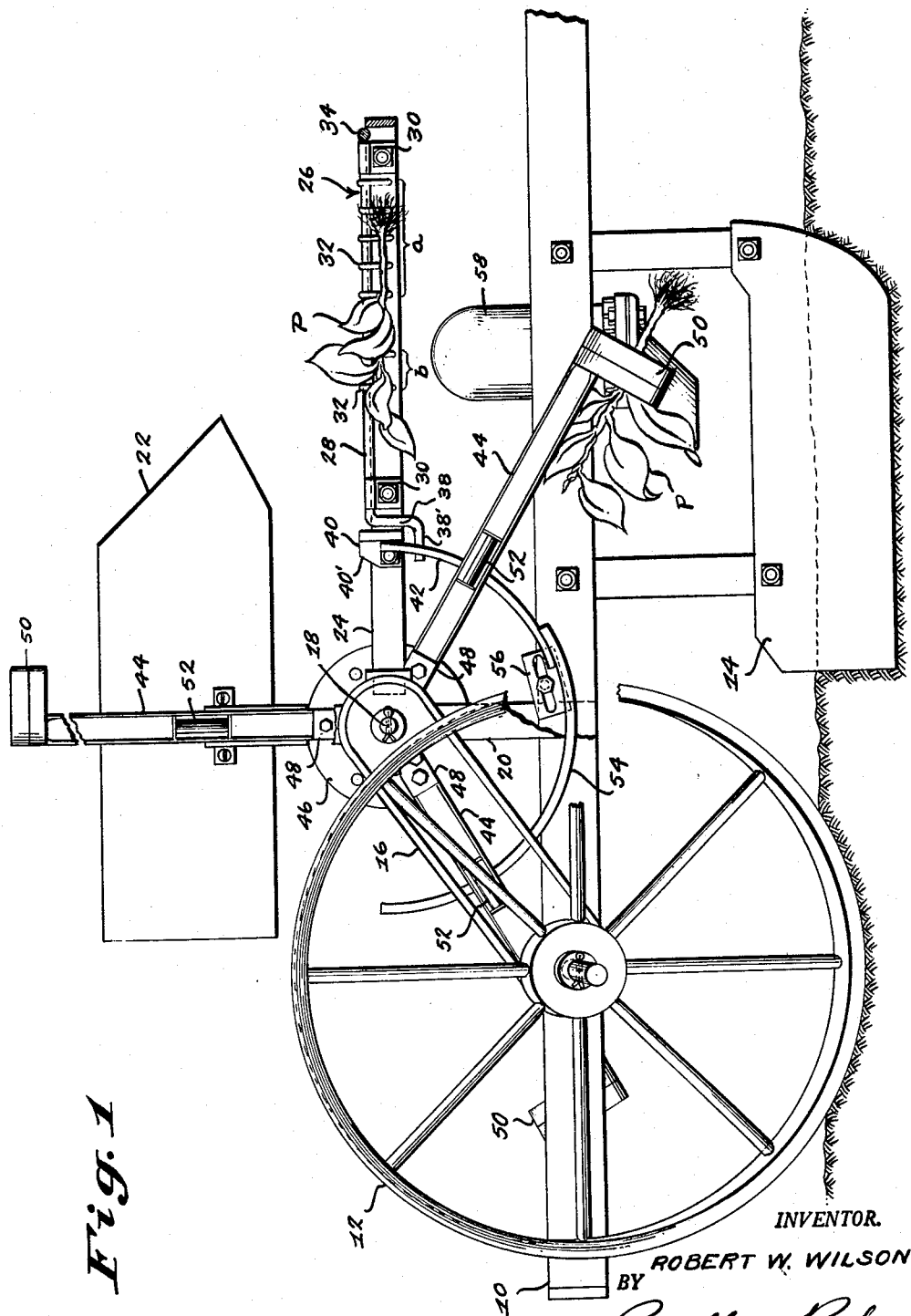
INVENTOR.
ROBERT W. WILSON
BY
Parrott & Richard
ATTORNEYS Nov. 8, 1960 R. W. WILSON 2,959,141
PLANT TRAY STRUCTURE FOR PLANT SETTING MACHINES
Filed Dec. 11, 1956 2 Sheets-Sheet 2
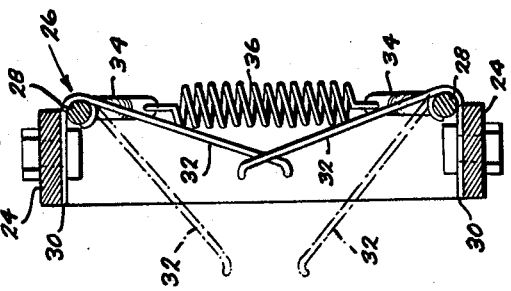
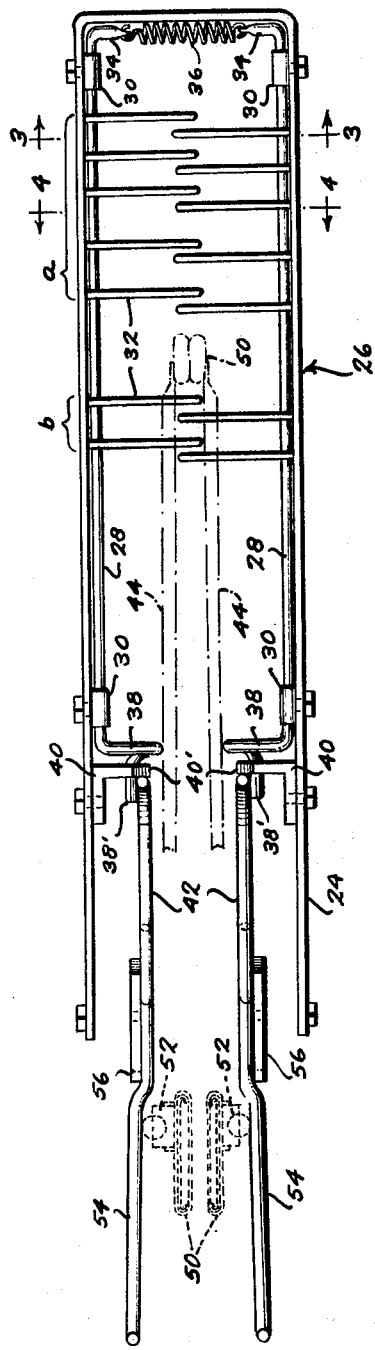
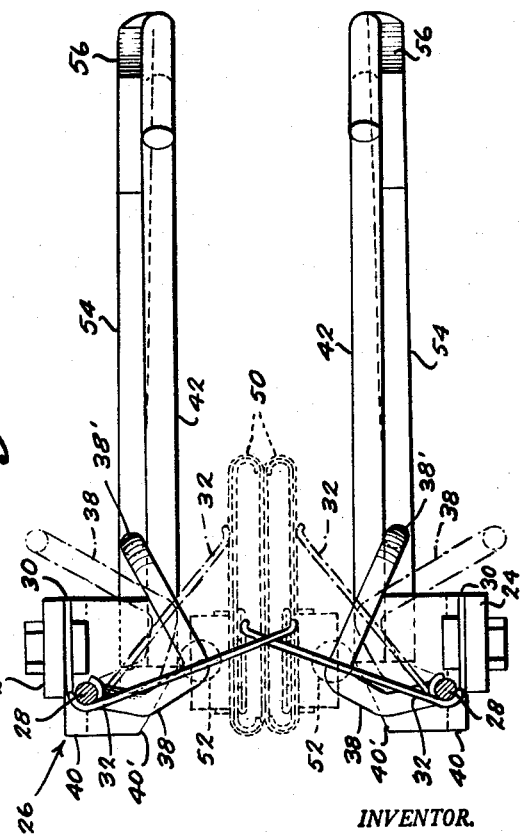
INVENTOR.
ROBERT W. WILSON
BY
Parrott & Richards
ATTORNEYS United States Patent Office 2,959,141
Patented Nov. 8, 1960

2,959,141

PLANT TRAY STRUCTURE FOR PLANT SETTING MACHINES

Robert W. Wilson, Charlotte, N.C., assignor to R. H. Bouligny, Inc., a corporation of North Carolina Filed Dec. 11, 1956, Ser. No. 627,608

4 Claims. (Cl. 111—2)

This invention relates generally to transplanting or plant setting machines, and more particularly to an improved plant tray structure for supporting a plant in position to be grasped for transplanting or setting by the setting means of a machine of this sort.

The improved plant tray structure of the present invention is characterized by an arrangement allowing a grasped plant to be removed downwardly therefrom, while maintaining an upwardly directed support for a plant thereon until a setting means has advanced to a position at which it can grasp the plant firmly. As a result of this arrangement the distance through which the plant must be transferred for setting can be made quite short, and the plant setting machine can be otherwise substantially simplified because, among other reasons, provision for actuating the setting means to grasp and release the plants needs to be made only at the above noted short transfer distance.

These and other features of the present invention are described in detail below in connection with the accompanying drawings, in which:

Fig. 1 is a side elevation, partly cut away and partly in section, of a plant setting machine incorporating a plant tray structure arranged in accordance with the present invention;

Fig. 2 is a plan view of the plant tray structure shown in Fig. 1;

Fig. 3 is an enlarged sectional detail taken substantially on the line 3—3 in Fig. 2; and Fig. 4 is a further enlarged sectional detail taken substantially on the line 4—4 in Fig. 2.

Referring now in detail to the drawings, and more particularly at first to Fig. 1, the illustrated plant setting machine incorporating the present invention comprises a main frame 10 carried on ground wheels 12 which may be canted and formed with concave rims, as shown, to act as covering means for closing a furrow prepared by an opening sword 14 carried forwardly on the frame 10. Any suitable form of hitch (not shown) may be arranged at the forward end of the main frame 10 (i.e., the end to the right in Fig. 1), the illustrated plant setting machine being arranged particularly for use as a lift attachment with a tractor, so that the hitch in this case would comprise an arrangement for attachment to the rear end lift mechanism of a tractor.

From the ground wheels 12 drive connections 16 run to an operating shaft 18 journalled on bracket arms 20 that are extended uprightly from the frame 10 to dispose the operating shaft 18 for carrying the setting means of the illustrated machine as described in further detail below. The upright bracket arms 20 are also arranged to support plant supply hoppers 22 at each side of the machine, and to carry a forwardly extending sub-frame 24 on which the improved plant tray structure of the present invention is mounted as indicated generally by the reference numeral 26.

This plant tray structure 26 comprises a pair of axle members 28 (compare Figs. 1 and 2) mounted on the sub-frame 24 in parallel spaced relation by brackets 30 so as to be rotatable about axes spaced laterally at each side and in substantially parallel relation with respect to the stalk of a plant P supported on the tray structure 26. The portion of the tray structure 26 on which a plant P is directly supported is formed by spaced rod elements 32 that are carried on the axle members 28 to extend laterally therefrom with overlapping reaches. The forward ends of the axle members 28 are formed inwardly, as shown at 34 in Figs. 2 and 3, and a tension spring 36 is extended between these ends 34 so as to bias the axle members 28 to a normal position at which the rod elements 32 extend therefrom with a downward inclination in cradle-like form for carrying and positioning a plant P centrally between the axle members 28.

The rod elements 32 are also specially arranged on the axle members 28 so that they are regularly spaced in forward and rearward groups $a$ and $b$ between which a spacing of increased extent is provided so as to form spaced supports for the root and top portions of a plant P, by the respective groups of rod elements $a$ and $b$, with an intervening space for grasping access at an intermediate stalk portion of the plant P. The axle members 28 are further formed at their rear ends with abutment arm portions 38 that extend inwardly, and then downwardly, and then rearwardly again as at 38', in relation to adjacent bracket members 40 (compare Figs. 2 and 4) that are fixed on the sub-frame 24 for positioning the upper ends of cam bars 42 to actuate the previously mentioned setting means in relation to the plant tray structure 26.

The setting means provided for operation in relation to the plant tray structure 26 of the present invention is of the same general type disclosed in copending application Serial No. 602,107, filed August 6, 1956, in that it comprises pairs of planting arms 44 arranged symmetrically on mounting plates 46 in radial relation about the operating shaft 18. The planting arms 44 are attached to the mounting plates 46 by leaf springs 48 which bias the extending ends of the planting arms 44 outwardly, rather than inwardly as in the above noted copending application, but the extending ends of the planting arms 44 are fitted with plant grasping means 50 of the same form disclosed by that applictaion. Each of the planting arms 44 is further arranged intermediate its length to carry a follower roll 52 through which its plant grasping and releasing action is actuated.

In operation, with the plant setting machine illustrated in Fig. 1 being drawn through a field to the right as seen in Fig. 1, operators, who may be provided with riding seats (not shown) at each side of the forward end of the main frame 10, select plants P from the supply hoppers 22 and respectively place them in the position illustrated on the plant tray structure 26 in advance of the approach of each pair of planting arms 44 thereto. A plant P in place on the plant tray structure 26 is positioned in the operating path of the planting arms 44, and the advancing pair of planting arms 44 will be biased outwardly to open position by the leaf springs 48 as they approach the plant tray structure 26. Upon such approach, the plant grasping means 50 at the extending ends of the planting arms 44 is disposed to travel through the enlarged spacing provided between the forward and rearward groups $a$ and $b$ of the plant supporting rod elements 32, and thereby move into position for grasping a supported plant P, while the follower rolls 52 carried on the planting arms 44 intermediate their length advance to operating contact with the bracket members 40 carrying the cam bars 42, and with the abutment arm portions 38 at the rear ends of the plant tray axle members 28.

The bracket members 40 have the upper portions of their inner edges inclined outwardly, as indicated at 40' in Fig. 4, and the planting arm follower rolls 52 reach these inclined edge portions 40' first and are directed thereby inwardly to a riding disposition at the upper entrance ends of the cam bars 42, so as to move the planting arms 44 and the grasping means 50 thereon inwardly to grasp a plant P supported in the path thereof on the tray structure 26. At the same time, in traveling down the inclined edge portions 40' of the bracket members 40, the planting arm follower rolls 52 strike the abutment arm portions 38 of the plant tray axle members 28 and cause these arm portions 38 to pivot downwardly. This downwardly pivoting of the abutment arm portions 38 in turn rocks the plant tray axle members 28 so as to cause a corresponding downward displacement of the spaced rod elements 32 carried thereon. This downward displacement, as illustrated by dotted lines in Figs. 3 and 4, results in opening a space between the extending reaches of the rod elements 32 through which the plant P grasped by the planting arms 44 may be carried downwardly with the follower rolls 52 riding the cam bars 42 to maintain the planting arm grasping means 50 closed on the plant P. After such downward removal of the grasped plant P, the follower rolls 52 will have passed below the abutment arm portions 38 so as to release them for recovery movement with the axle members 28 under the force of tension spring 36 to their normal disposition at which the plant tray rod elements again extend in overlapping relation to receive a succeeding plant P thereon in position to be grasped for setting by a succeeding pair of planting arms 44. In this connection, it should also be noted that the rearwardly extending lengths 38' of the axle member abutment arm portions 38 reach behind cam bars 42 (see Figs. 4 and 5) so as to serve as stop elements limiting the recovery travel of the axle members 28 to this normal biased position.

The cam bars 42 that maintain the planting arms 44 in grasping relation with a plant P removed from the plant tray structure 26 extend downwardly to a disposition at their lower ends aligned above a second pair of cam bars 54 that are arranged on bracket plates 56 adjustably secured to the main frame 10. This second pair of cam bars 54 are outwardly stepped intermediate their length, as illustrated at 54' in Fig. 2, so as to allow outward movement of the planting arm follower rolls 52 and thereby provide for opening the plate grasping means 50 at the extending ends of the planting arms 44 to release a plant P therefrom at a proper setting position in the furrow prepared by the opening sword 14, as previously mentioned, and in which water may be deposited periodically for each newly set plant by actuation of a water valve at 58 by the setting means as the planting arms 44 travel downwardly to the setting position.

The result of this arrangement is a very simple structure that operates with consistent effectiveness for setting plants P in the above described manner and that provides a practical plant setting mechanism with a very substantial reduction in operating structure from what has heretofore been usual.

The present invention has been described in detail above for purposes of illustration only and is not intended to be limited by this description or otherwise except as defined in the appended claims.

I claim:

1. In a plant setting machine of the type incorporating cyclically traveling plant grasping and setting means, and cam means disposed for cyclically operating said first mentioned means to grasp a plant at a pickup station and transfer said plant downwardly from said pickup station for release at a setting position, the improvement which comprises means for supporting a plant in position to be grasped for setting by said first mentioned means comprising at least one plant carrying and positioning member mounted pivotally and extending laterally across the cyclic operating path of said first mentioned means and displaceable downwardly about said pivotal mounting in substantially parallel and laterally spaced relation with respect to the stalk of a plant positioned thereon, said plant carrying and positioning member being formed to leave a portion of said stalk unsupported for grasping by said first mentioned means, and abutment means connected to said plant carrying and positioning member and extending laterally inward from said pivotal mounting in the cyclic operating path of said first mentioned means and spaced from said plant carrying and positioning member for effecting downward displacement thereof through contact at said abutment means by said first mentioned means as a plant supported on said plant carrying and positioning member is grasped by said first mentioned means through the action of said cam means.

2. In a plant setting machine, setting means comprising at least one setting arm structure extending from a support adjacent one end for cyclic operating travel and carrying plant grasping means at the other extending end thereof, cam means disposed for cyclically operating said setting arm structure to grasp a plant at a pickup station and transfer said plant downwardly from said pickup station for release at a setting position, and means for supporting a plant at said pickup station for grasping by said setting arm structure comprising a plant carrying and positioning structure forming supports for root and top portions of a plant to be set and between which supports an intermediate stalk portion of said plant is left unsupported for grasping by said grasping means at the extending end of said setting arm structure, said plant carrying and positioning structure being pivotally mounted and extending laterally at said pickup station across the cyclic operating path of said setting arm structure and being yieldably biased at said extending position for displacement from said path about said pivotal mounting in substantially parallel and laterally spaced relation with respect to the stalk of a plant positioned thereon, and abutment means connected to said plant carrying and positioning structure and extending laterally inward from said pivotal mounting in the cyclic operating path of said setting arm structure intermediate the extending length thereof and spaced from said plant carrying and positioning structure for effecting displacement thereof from said operating path through contact by said setting arm structure intermediate the extending length thereof with said abutment means as a plant supported at said pickup station is grasped by said grasping means at the extending end of said setting arm structure through the action of said cam means.

3. In a plant setting machine, the structure defined in claim 2 and further characterized in that said plant carrying and positioning structure comprises a pair of axle members spaced laterally in parallel relation at each side of the path of said setting arm structure and forming displacement axes for said plant carrying and positioning structure, spaced rod elements carried on said axle members for forming said plant root and top portion supports extending across the path of said setting arm structure, the respective extending reaches of said rod elements overlapping across said path, and said axle members having laterally extending arm portions thereon forming said abutment means.

4. In a plant setting machine, the structure defined in claim 3 and further characterized in that said setting arm structure comprises a pair of opposed setting arms having finger members forming said plant grasping means at the extending ends thereof, said opposed setting arm being biased for normally maintaining said finger members open and having cam follower roller members mounted intermediate the extending length thereof at which said cam means acts on said opposed setting arms to close said finger members at said pickup station and thereby grasp a plant thereat, and the arm portions of said axle members being disposed for contact by said setting arm roller members to effect said displacement of the plant carrying and positioning structure as a plant supported thereon is grasped by said finger members.

References Cited in the file of this patent

UNITED STATES PATENTS

| | | |
|---|---|---|
| 532,740 | Gundersen | Jan. 15, 1895 |
| 570,905 | Cheeseman | Nov. 10, 1896 |
| 1,637,980 | Arnold | Aug. 2, 1927 |

FOREIGN PATENTS

| | | |
|---|---|---|
| 895,779 | France | Apr. 11, 1944 |